United States Patent [19]

Schneider

[11] Patent Number: 4,545,901
[45] Date of Patent: Oct. 8, 1985

[54] LIQUID-LIQUID EXTRACTION PROCESS

[76] Inventor: John C. Schneider, R.R. #2, Acton, Ontario, Canada, L7J 2L8

[21] Appl. No.: 544,695

[22] Filed: Oct. 24, 1983

[51] Int. Cl.[4] .............................................. B01D 11/04
[52] U.S. Cl. .................................. 210/634; 422/259; 423/658.5
[58] Field of Search ............... 210/519, 521, 320, 634; 422/255-259; 423/658.5, 8; 23/293 R

[56] References Cited

U.S. PATENT DOCUMENTS

| | | | |
|---|---|---|---|
| 2,937,078 | 5/1960 | Dukes et al. | 422/259 |
| 4,404,173 | 9/1983 | Bailey et al. | 422/257 |

FOREIGN PATENT DOCUMENTS

| | | | |
|---|---|---|---|
| 858986 | 12/1952 | Fed. Rep. of Germany | 422/259 |
| 885503 | 12/1961 | United Kingdom | 422/259 |
| 2053716 | 2/1981 | United Kingdom | 422/259 |
| 2088243 | 6/1982 | United Kingdom | 422/259 |

Primary Examiner—Benoit Castel
Attorney, Agent, or Firm—Ridout & Maybee

[57] ABSTRACT

A process is described for continuously extracting a first liquid with a second liquid, the two liquids being capable of forming two separate phases defining a liquid-liquid interface. The process comprises contacting the two liquids in an apparatus defining a plurality of mixing chambers and at least one settling chamber, wherein the liquids are continuously agitated in the mixing chambers to provide mixing in a zone in the proximity of the liquid-liquid interface while maintaining substantial phase integrity beyond the agitation zone. Extracted liquids are separated in the settling chamber and removed from the apparatus.

12 Claims, 5 Drawing Figures

LIQUID-LIQUID EXTRACTION PROCESS

FIELD OF THE INVENTION

The invention relates to a continuous liquid-liquid extraction process. The present invention is adaptable to a number of applications including solvent extraction of mineral leach liquor which may comprise a slurry of crushed ore in an aqueous medium, as well as purely liquid-liquid contacting applications. Thus, in the context of the present specification, the term "liquid" is meant to include a slurry.

BACKGROUND OF THE INVENTION

An extraction process for which the invention may be used involves the contacting of two liquid phases wherein the liquids are substantially immiscible and of different densities such as an aqueous-organic extraction process. However, the invention may also be used in an extraction process involving two miscible liquids which have specific gravity differences sufficient to result in two separate phases. Prior devices for effecting this kind of liquid-liquid extraction comprise a number of mixing and settling tanks which alternate in series with the liquids flowing countercurrently to one another. These prior devices utilize strong agitation in the mixing stages which often has resulted in the formation of emulsions or three phase systems which causes a reduction in the efficiency of such processes by prolonging the separation times. The prior devices also often require pumping means for transferring the liquids from one stage to another. Such pumping means may comprise complex arrangements of pipes, valves and pumps which add significantly to the cost while reducing the reliability of the device.

Prior devices generally have employed means for thoroughly agitating the liquids in the mixing stages in order to achieve maximum extraction efficiency at each stage and thereby minimizing the number of stages needed to effect the desired extraction. In addition to the disadvantages aforementioned relating to such prior devices, this thorough agitation is energy intensive and with the present high cost of energy detracts from the cost effectiveness thereof.

SUMMARY OF THE INVENTION

The present invention overcomes the disadvantages of conventional mixer-settlers by providing a series of mixing chambers connected linearly one to another by means of apertures in partitions dividing the chambers. The flow path of liquids may be affected by the positioning of baffles near the partitions and apertures therethrough. The agitation provided in each mixing chamber is much gentler than that found in conventional devices so that less energy is needed and settling times are greatly reduced. In the present device, emulsions do not tend to form and there is no need to provide settling chambers between the mixing chambers, but rather only one settling chamber is needed at the end of the flow-path for each liquid.

DESCRIPTION OF THE INVENTION

While the present device is thought to have greater application for countercurrent extraction processes, the invention is also useful for co-current applications.

The gentle agitation of the liquids in each mixing chamber allows for a substantial degree of control over the solution characteristics of each liquid. Because each phase maintains a significant degree of integrity in the mixing chambers of the present apparatus, such characteristics as the pH, EMF, and solute concentrations may be controlled much more effectively than is possible with prior devices.

Accordingly, the present invention provides a process for continuously extracting a first liquid with a second liquid, the two liquids being capable of forming two separate phases defining a liquid-liquid interface, comprising: continuously contacting the two liquids in an apparatus having a bottom, a top, two sides, two ends, means near each end for supplying and withdrawing liquid from the apparatus, and a plurality of partitions positioned within the apparatus defining a plurality of mixing chambers and at least one settling chamber having liquid exiting from the apparatus, each partition having at least one aperture through which liquid may flow from chamber to chamber, the mixing chambers being adjacent one another linearly and having means for agitating the liquids therein; continuously flowing the liquids through the mixing chambers while continuously agitating the liquids in each mixing chamber to provide mixing thereof in a zone in the proximity of the liquid-liquid interface while maintaining substantial phase integrity beyond the agitation zone; continuously flowing the liquids through the mixing chambers at a rate sufficient to achieve the desired extraction efficiency; continuously flowing the extracted liquids to a settling chamber for separation of the liquids; and continuously removing at least one separated liquid from the settling chamber and the apparatus.

DESCRIPTION OF THE PREFERRED EMBODIMENTS

Figure 1:
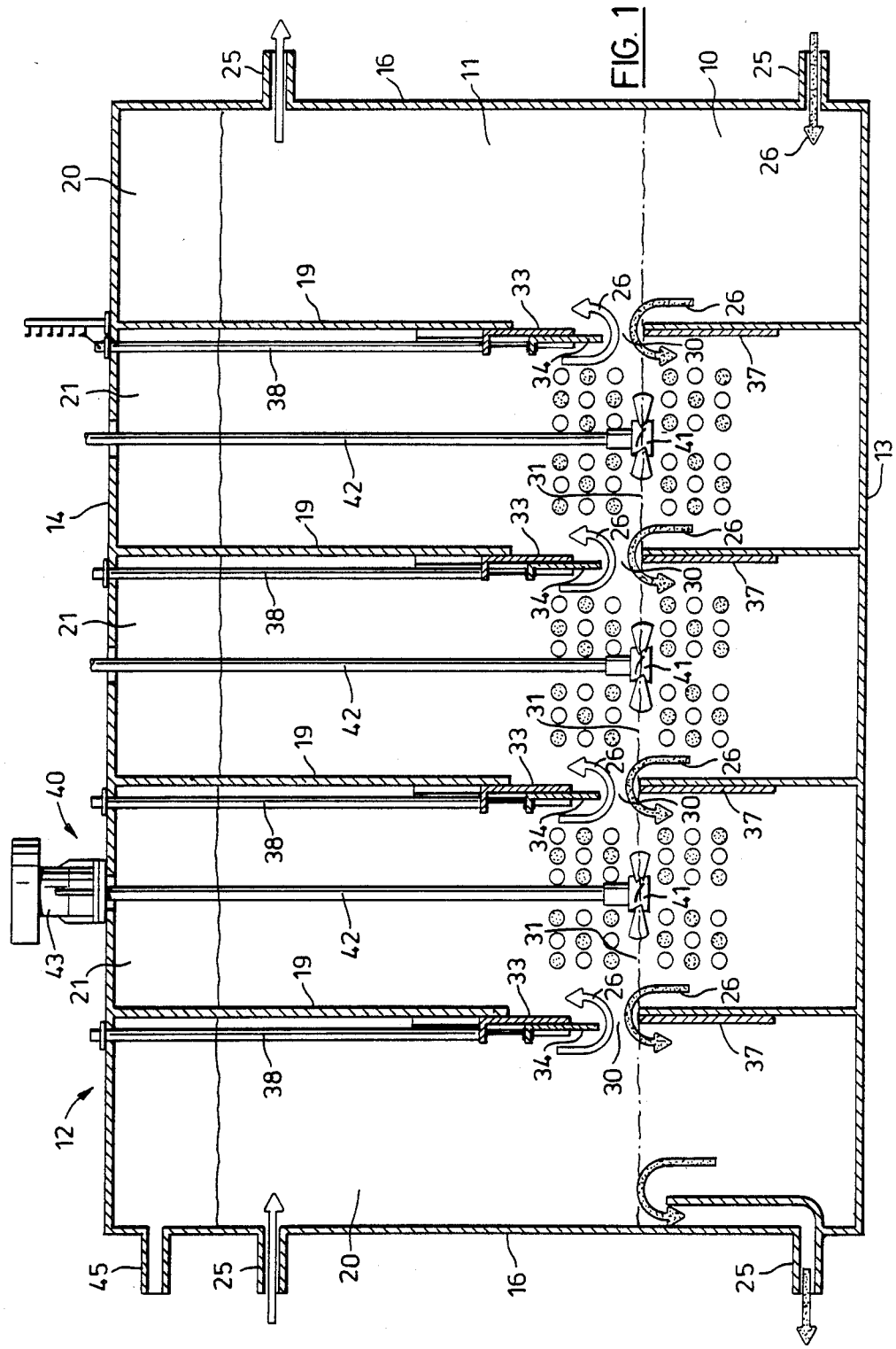
FIG. 1 is a side cross sectional view of the apparatus showing three adjacent mixing chambers with a settling chamber at each end thereof.
Figure 2:
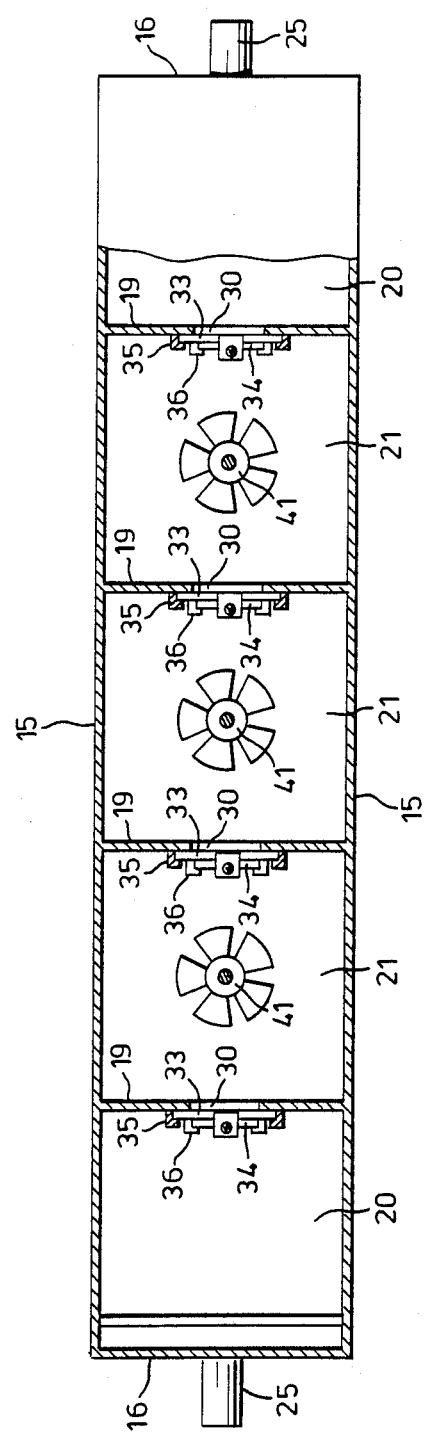
FIG. 2 is an overhead view partially cut away of the apparatus of FIG. 1.
Figure 3:
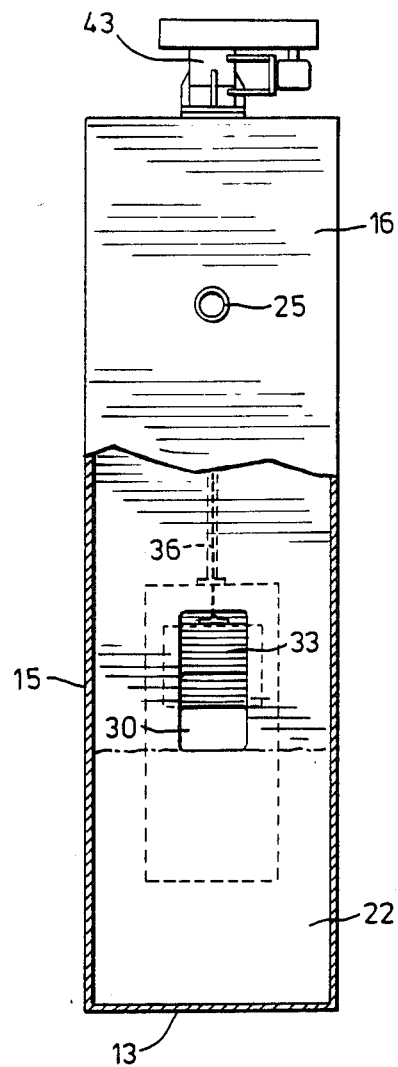
FIG. 3 is an end view of the apparatus, partially cut away to show details of the apertures through a partition and gate means associated with one of the apertures.

Referring to FIG. 1, a preferred configuration of an apparatus made in accordance with the invention is shown. The apparatus of FIG. 1 is intended for use in a liquid/liquid countercurrent extraction process. Normally, the liquids will be substantially immiscible with the denser liquid forming a lower phase 10 while the less dense liquid forms an upper phase 11.

The apparatus preferably comprises a rectangular tank 12 having a bottom 13, a top 14, two sides 15 and two ends 16. The tank 12 is divided by partitions 19 into a plurality of chambers comprising a settling chamber 20 at each end and a series of mixing chambers 21 therebetween.

In the countercurrent extraction process shown in FIG. 1, the lower phase 10 enters the tank 12 through the lower right nipple 25, and the upper phase enters through the upper left nipple 25. Arrows 26 show the flow pattern of the two phases through the tank 12. The partitions 19 have at least one aperture 30 located in the vicinity of the liquid-liquid interface 31 to provide a means for circulation of the liquids through the tank 12. The size and location of the aperture 30 in each partition 19 is adjustable by means of a door having upper and lower panels 33 and 34. The upper panel 33 may travel within rails 35 affixed to the partition 19, and the lower panel 34 may travel within rails 36 affixed to the panel 33 and a lower stationary panel 37 which is affixed below the aperture 30 to the partition 19. The movement and positioning of the door panels 33 and 34 is governed by a control rod 38 attached thereto. As mentioned the location of the aperture 30 should proximate the phase interface 31 so that thoroughly mixed liquids pass from one chamber 21 to the next. Depending on the application, it is clearly advantageous to have the capability to adjust the size and location of the aperture 30 in order to optimize the efficiency of the process.

Mixers 40 each comprise a shaft 42 to which one or more impellers 41 are attached. A motor 43 is attached to the upper end of the shaft 42, and causes the shaft 42 to rotate with sufficient speed to effect the desired degree of mixing. The degree of agitation caused by the mixers 40 is governed by the design of the impellers 41 as well as by the speed of rotation of the shaft 42. Thus, a shaft rotating at a constant rate can cause various degrees of mixing along its length by virtue of the placement and design of impellers 41. As can be seen from FIG. 1, it is considered necessary to have at least one impeller 41 located in the proximity of the phase interface 31 in each mixing chamber 21 depending on the application, additional impellers can be added for agitation of the upper or lower phases.

It is often desirable to carry out extractions in an inert atmosphere. Where this is the case, the tank 12 may be provided with a nitrogen gas inlet nipple 45 near the top 14 thereof.

As stated above, the present invention requires only one settling chamber 20 at each end of the apparatus for use in a countercurrent extraction process as shown in the drawings, or only one settling chamber 20 at the exit end of an apparatus of the invention used for a co-current extraction process. This feature is made possible due to the reduced agitation applied to the liquids in each mixing chamber 21 as compared to the degree of agitation conventionally employed in mixer-settler devices. The reduced agitation used in the present apparatus means that emulsions are much less likely to form and hence separation times are greatly reduced. For example, a conventional mixer operates at 650 rpm to achieve a 90% efficient extraction in a typical two phase system. However, this separation time for liquids typically agitated in this fashion is in excess of 10 minutes, and may be much greater where an emulsion is formed. In contrast to this conventional procedure, the present apparatus provides agitation in the mixing chambers 21 at about 200 rpm. This gentler agitation only reduces the extraction efficiency in a typical system to 85%, but the time needed to enable the two phases to separate is reduced dramatically to about one minute.

Thus, while the extraction efficiency per mixing chamber 21 is somewhat lower with the present apparatus than with conventional mixer-settlers, the overall process is more efficient since the same overall extraction efficiency can be achieved by using more mixing chambers 21 in the present apparatus, and the problems associated with emulsion formation are essentially eliminated.

Figure 4:
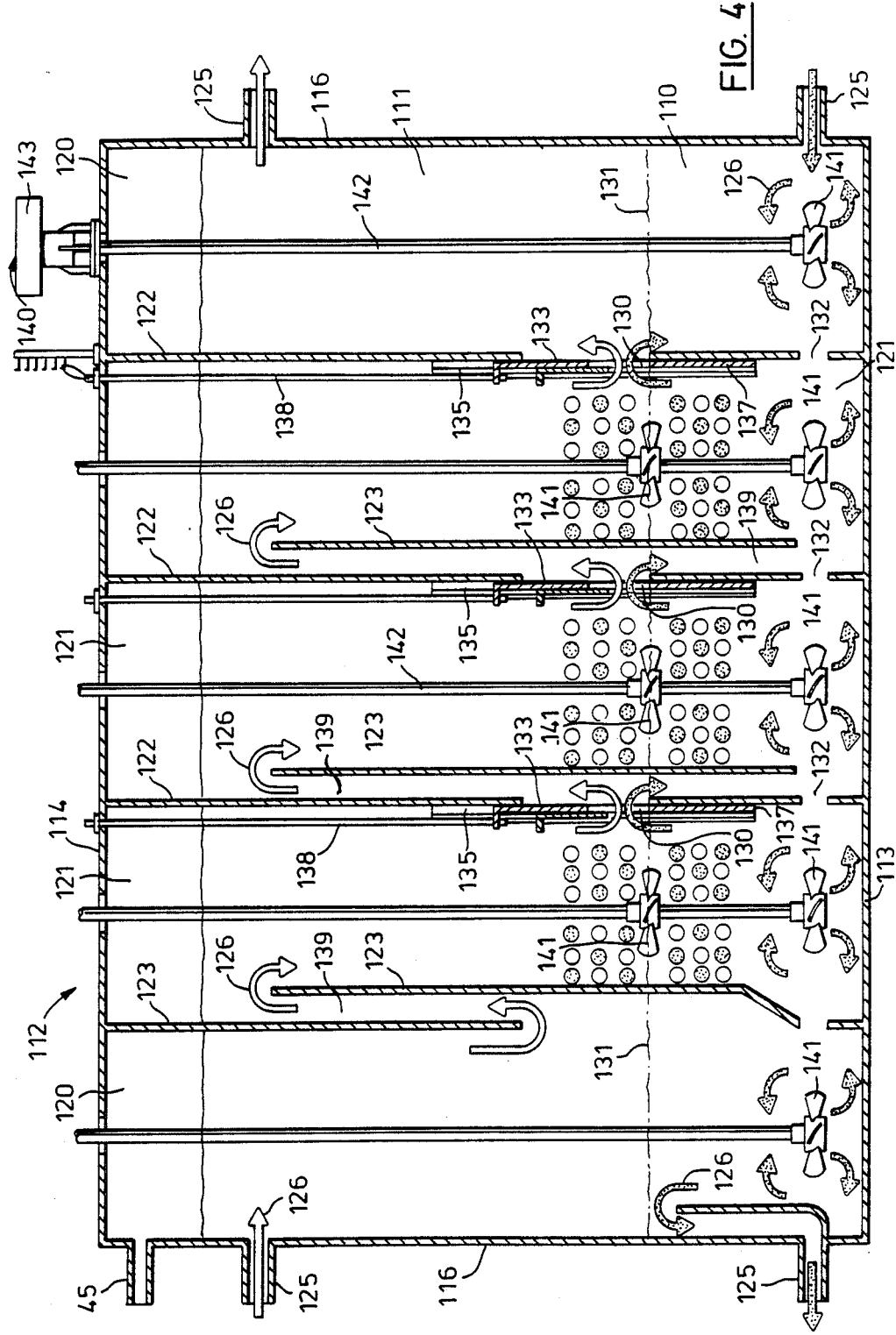
FIG. 4 is a side cross sectional view of a version of the apparatus adapted for the extraction of an ore slurry.
Figure 5:
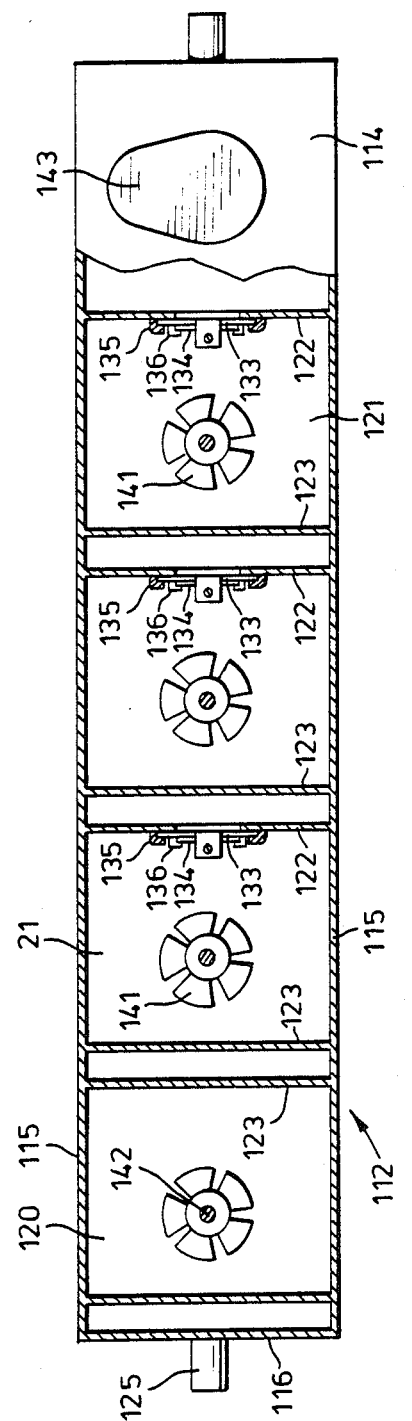
FIG. 5 is an overhead view partially cut away of the apparatus of FIG. 4.

A second preferred apparatus of the invention is shown in side cross section in FIG. 4. This particular apparatus is intended for use in a mining or metallurgical application wherein a slurry 110 of crushed rock or ore in an aqueous medium is extracted countercurrently with a less dense organic solvent 111.

The apparatus preferably comprises a rectanguar tank 112 having a bottom 113, a top 114, two sides 115 and two ends 116. The tank 112 is divided into a plurality of chambers comprising a settling chamber 120 at each end and a series of mixing chambers 121 therebetween, by partitions 122 and baffles 123. Each end 116 of the tank 112 is provided with inlet and outlet nipples 125 toward the top and bottom thereof for introducing and withdrawing the two phases.

In the countercurrent extraction process shown in FIG. 4, the slurry 110 enters the tank 112 through the lower right nipple 125, and the organic solvent enters through the upper left nipple 125. Arrows 126 show the flow pattern of the two phases through the tank 112. The partitions 122 have at least one aperture 130 located in the vicinity of the liquid-liquid interface 131 to provide a means for circulation of the liquids through the tank 112. In the case shown in FIG. 4, the partitions 122 also have an aperture 132 near the bottom 113 of the tank 112 to allow for circulation of the slurry 110 through the tank 112 by way of apertures 132 as well as apertures 130. This arrangement reduces the likelihood of serious emulsion formation which commonly plaques conventional slurry extraction devices.

The size and location of the aperture 130 in each partition 122 is adjustable by means of a door having upper and lower panels 133 and 134. The upper panel 133 may travel within rails 135 affixed to the partition 122, and the lower panel 134 may travel within rails 136 affixed to the panel 133 and a lower stationary panel 137 which is affixed below the aperture 130 to the partition 122. The movement and positioning of the door panels 133 and 134 is governed by a control rod 138 attached thereto. As mentioned the location of the aperture 130 should proximate the phase interface 131 so that thoroughly mixed liquids pass from one chamber 121 to the next.

The flow path of the liquids through the tank 112 is further determined by the placement of the baffles 123 at locations near the boundaries of adjacent chambers so as to create channels 139 through which the liquids flow. The baffles 123 extend from each side 115 across the tank 112, and as shown in FIG. 4, a baffle 123 may extend to the top 114 or bottom 113 of the tank 112 depending on the purpose for which it is intended. As seen in FIG. 4, the left hand settling chamber 120 is provided with overlapping baffles 123 at its right hand boundary so that only the organic phase 111 is introduced into the adjacent mixing chamber 121. These overlapping baffles 123 act as under and over flow weirs.

In the case where a slurry is being extracted, as shown in FIG. 4, each chamber 120 and 121 must be equipped with a mixer 140 having an impeller 141 located in the slurry 110 for the purpose of agitating the slurry 110 sufficiently to prevent settling out of the solids therein.

The mixers 140 each comprise a shaft 142 to which one or more impellers 141 are attached. A motor 143 is attached to the upper end of the shaft 142, and causes the shaft 142 to rotate with sufficient speed to effect the desired degree of mixing. The degree of agitation caused by the mixers 140 is governed by the design of the impellers 141 as well as by the speed of rotation of the shaft 142. Thus, a shaft rotating at a constant rate can cause various degrees of mixing along its length by virtue of the placement and design of impellers 141. As can be seen from FIG. 4, the mixing chambers 121 have impellers 141 located at the phase interface 131 and in the slurry 110. Depending on the application, an additional impeller 141 can be added for agitation of the upper organic phase 111.

The construction of the present apparatus employing the baffles 123, as described above, allows for partial separation of the phases to occur as the liquids pass from one mixing chamber 121 to another.

The rapid phase separation times inherent in processes which are performed using the present invention allows for the continuous flow of liquids through the apparatus. This is a major concern for large scale applications such as ore extractions used in the mining industry. The elimination of the need for huge settling tanks, the capacity of which governs the rate of the extraction process in conventional systems, will result in a large cost savings for users of the present apparatus. This aspect alone satisfies a long felt need especially in the ore processing industry where emulsion formation during extraction is a particular problem.

In addition to the process advantages associated with the reduced agitation used in the present apparatus, the lower speed of the mixers 40 requires less energy output by the motors 43 as compared with conventional devices. Since the rpm of the mixer 40 is proportionally related to the cube of the horsepower needed to effect the desired rpm in a liquid mixer, the reduction in the speed of the mixer 43 to ⅓ that conventionally used gives a horsepower reduction of about 1/27. Clearly, this power reduction results in considerable energy savings in the present apparatus when compared to conventional devices. This is the case even if several more mixing stages are required in the present apparatus to effect an extraction of comparable efficiency to that of a conventional device.

I claim:

1. A process for continuously extracting a first liquid with a second liquid, the two liquids being capable of forming two separate phases defining a liquid-liquid interface, comprising:

continuously contacting the two liquids in an apparatus having a bottom, a top, two sides, two ends, means near each end for supplying and withdrawing liquid from the apparatus, and a plurality of partitions positioned within the apparatus defining a plurality of mixing chambers and a settling chamber at each end, at least one settling chamber having liquid exiting from the apparatus, each partition having at least one aperture through which liquid may flow from chamber to chamber, the mixing chambers being adjacent one another linearly and having means for agitating the liquids therein;

contacting the liquids initially in a settling chamber and then continuously flowing the liquids through the mixing chambers while continuously agitating the liquids in each mixing chamber to provide mixing thereof in a zone in the proximity of the liquid-liquid interface while maintaining substantial phase integrity beyond the agitation zone, said flow from chamber to chamber being carried out at the agitation zone;

continuously flowing the liquids through the mixing chambers at a rate sufficient to achieve the desired extraction efficiency;

continuously flowing the extracted liquids to a settling chamber for separation of the liquids; and continuously removing at least one separated liquid from the settling chamber and the apparatus.

2. A process as claimed in claim 1, wherein the first and second liquids are substantially immiscible.

3. A process as claimed in claim 1, wherein one liquid comprises a slurry of solid particles suspended therein.

4. A process as claimed in claim 3, wherein the slurry is continuously agitated to maintain the suspension of the solid particles therein.

5. A process as claimed in claim 1, wherein the flow of liquids is countercurrent to one another.

6. A process as claimed in claim 1, wherein the flow of liquids is cocurrent.

7. A process for continuously extracting a first liquid with a second liquid, the two liquids being capable of forming two separate phases defining a liquid-liquid interface, comprising:

continuously contacting the two liquids in an apparatus having a bottom, a top, two sides, two ends, means near each end for supplying and withdrawing liquid from the apparatus, and a plurality of partitions and baffles positioned within the apparatus defining a plurality of mixing chambers and a settling chamber at each end, at least one settling chamber having liquid exiting from the apparatus, each partition having at least one aperture through which liquid may flow from chamber to chamber, each baffle coacting with a partition or a second baffle to define a channel for the flow of liquid from chamber to chamber, the mixing chambers being adjacent one another linearly and having means for agitating the liquids therein;

contacting the liquids initially in a settling chamber and then continuously flowing the liquids through the mixing chambers while continuously agitating the liquids in each mixing chamber to provide mixing thereof in a zone in the proximity of the liquid-liquid interface while maintaining substantial phase integrity beyond the agitation zone;

continuously flowing the liquids through the mixing chambers at a rate sufficient to achieve the desired extraction efficiency;

continuously flowing the extracted liquids to a settling chamber for separation of the liquids; and continuously removing at least one separated liquid from the settling chamber and the apparatus.

8. A process as claimed in claim 7, wherein the first and second liquids are substantially immiscible.

9. A process as claimed in claim 7, wherein one liquid comprises a slurry of solid particles suspended therein.

10. A process as claimed in claim 9, wherein the slurry is continuously agitated to maintain the suspension of solid particles therein.

11. A process as claimed in claim 7, wherein the flow of liquids is countercurrent to one another.

12. A process as claimed in claim 7, wherein the flow of liquids is cocurrent.

* * * * *